(12) United States Patent
Molnar

(10) Patent No.: US 6,988,142 B2
(45) Date of Patent: Jan. 17, 2006

(54) METHOD AND APPARATUS FOR HANDLING COMMUNICATION REQUESTS AT A SERVER WITHOUT CONTEXT SWITCHING

(75) Inventor: Ingo Molnar, Gyongyos (HU)

(73) Assignee: Red Hat, Inc., Durham, NC (US)

( * ) Notice: Subject to any disclaimer, the term of this patent is extended or adjusted under 35 U.S.C. 154(b) by 930 days.

(21) Appl. No.: 09/934,658

(22) Filed: Aug. 22, 2001

(65) Prior Publication Data

US 2002/0091868 A1 Jul. 11, 2002

Related U.S. Application Data

(60) Provisional application No. 60/227,510, filed on Aug. 24, 2000.

(51) Int. Cl.
*G06F 15/16* (2006.01)
*G06F 9/46* (2006.01)

(52) U.S. Cl. .................. 709/230; 709/227; 709/228; 709/229; 718/108

(58) Field of Classification Search ............... 709/203, 709/205, 216, 219, 227, 228, 230; 718/100, 718/102, 108
See application file for complete search history.

(56) References Cited

U.S. PATENT DOCUMENTS

| 5,515,538 A | | 5/1996 | Kleiman |
| 5,781,550 A | * | 7/1998 | Templin et al. ............. 370/401 |
| 5,832,513 A | | 11/1998 | Kennedy |
| 5,872,963 A | | 2/1999 | Bitar et al. |
| 6,011,803 A | * | 1/2000 | Bicknell et al. ............ 370/467 |
| 6,034,963 A | * | 3/2000 | Minami et al. ............. 370/401 |
| 6,179,489 B1 | * | 1/2001 | So et al. ..................... 718/102 |
| 6,246,683 B1 | * | 6/2001 | Connery et al. ............ 370/392 |
| 6,336,140 B1 | * | 1/2002 | Elgressy et al. ............ 709/224 |
| 6,389,479 B1 | * | 5/2002 | Boucher et al. ............ 709/243 |
| 6,427,173 B1 | * | 7/2002 | Boucher et al. ............ 709/238 |
| 6,483,840 B1 | * | 11/2002 | Vogel ........................ 370/401 |
| 6,575,746 B2 | * | 6/2003 | Hirsch et al. ................. 433/93 |
| 6,625,650 B2 | * | 9/2003 | Stelliga ..................... 709/226 |
| 6,658,480 B2 | * | 12/2003 | Boucher et al. ............ 709/239 |
| 6,678,746 B1 | * | 1/2004 | Russell et al. ................ 710/1 |

OTHER PUBLICATIONS

Preslan K. W. et al., "A 64-bit, shared disk file system for Linux", Mass Storage Systems, 1999 pp. 22–41.
Anderson, D. et al., "Failure–atomic file access in an interposed network storage system", Dept. of Computer Science, Duke University pp. 159–162.
Moon D. A., "Genera retrospective", Objective Orientation in Operating Systems, 1991 IEEE Comput. Soc., US (Oct. 17 1991) pp 2–8.

* cited by examiner

*Primary Examiner*—Maid A. Banankhah
(74) *Attorney, Agent, or Firm*—Moore & Van Allen PLLC; Steven B. Phillips

(57) ABSTRACT

Method and apparatus for handling communication requests at a server without context switching. An application protocol subsystem and protocol modules are disposed within an operating system kernel at a server. The protocol subsystem creates an "in-kernel" protocol stack that stores information regarding application protocol requests, such as HTTP and FTP requests, in a kernel request structure. A user space application can then continue execution while the operating system responds to the application protocol request without context switching. In this way, application protocol requests received over a network are handled and responded to by the server without causing a context switch.

20 Claims, 6 Drawing Sheets

METHOD AND APPARATUS FOR HANDLING COMMUNICATION REQUESTS AT A SERVER WITHOUT CONTEXT SWITCHING

CROSS-REFERENCE TO RELATED APPLICATIONS

This application claims priority from co-pending provisional patent application Ser. No. 60/227,510, filed Aug. 24, 2000 by the inventor hereof, the entire disclosure of which is incorporated herein by reference.

Much of what is disclosed in this application is also disclosed in application Ser. No. 09/934,738, entitled, "Embedded Protocol Objects," an Ser. No. 09/934,659, entitled, "Method and Apparatus for Atomic File Look-up," both filed on even date herewith and assigned to the assignee of the present application, both of which are incorporated herein by reference.

CROSS-REFERENCE TO COMPUTER PROGRAM LISTING APPENDIX

A portion of the present disclosure is contained in a compact disc, computer program listing appendix. The compact disc contains an MS-DOS file entitled "tux2-full.txt" created on Jun. 15, 2001, of 1,057 kilobytes. The contents of this file are incorporated herein by reference. Any references to "the appendix" or the like in this specification refer to the file contained on the compact disc.

The contents of this file are subject to copyright protection. The copyright owner has no objection to the reproduction by anyone of the patent document or the appendix as it appears in the Patent and Trademark Office patent files or records, but does not waive any other copyrights by virtue of this patent application.

BACKGROUND

The Internet comprises a vast number of computers and computer networks that are interconnected through communication links. The communication links exchange digital information using the well-known, standard transmission control protocol/Internet protocol (TCP/IP). Application protocols such as hypertext transmission protocol (HTTP) and file transfer protocol (FTP) are used on top of TCP/IP. Similar or identical transmission protocols and application protocols are also used by modern computers to communicate via private networks, such as intranets and local area networks (LAN's). These application protocols allow a server computer system to send information to a remote client computer system. The remote client computer system can then display or otherwise make use of the information. In the case of HTTP, the information might be displayed in the form of a so-called World Wide Web page.

The dramatic increase in Internet usage and in other forms of client/server communication in recent years has meant that servers receive more and more requests and are handling more and more connections and responses. Therefore, the speed at which servers operate in terms of the number of requests handled in a given time period has become very important in the overall speed and performance of Internet and other computer communication systems.

One process that slows down the performance of an operating system and applications installed on a server is the process of switching the context of execution. The context of execution is also referred to as simply the "context", "process", "thread" or "task". The context is a basic unit of multitasking operating system kernels. The operating system kernel is that part of the operating systems that handles hardware resources and performs the fundamental operations of the operating system. Some current operating system kernels include some low level protocol functions, such as TCP/IP functions. In any case, a context switch is the "switching" between two or more processes, so that each process can use the central processing unit (CPU).

Context switches are fruitless in the sense that no useful application work is done by context switching. Some operations within a multitasking operating system or the applications installed on such a system can be performed without context switching. Such operations are often called "atomic" operations. However, operations that involve input and output, or "I/O", normally require a context switch. Such operations include accessing media devices, and unfortunately, communicating over a network using an application protocol.

SUMMARY

The present invention allows application protocol requests received over a network to be handled and responded to at a server without causing a context switch. The invention enables this functionality by providing an application protocol subsystem and protocol modules within the operating system kernel. The protocol subsystem creates an "in-kernel" application protocol stack that stores information regarding application protocol requests in a kernel request structure. A user space application can then continue execution while the operating system responds to the application protocol request without context switching.

According to one embodiment of the invention, a server includes an operating system having a kernel and a user space. The server responds to application protocol requests received by establishing a user space request structure corresponding to the application protocol request, and creating a kernel request structure corresponding to the application protocol request. The server uses data received from the client in conjunction with the application protocol request to create the kernel request structure. The operating system updates the user space request structure in accordance with the kernel request structure so that an application in the user space can continue execution and the operating system can respond to the application protocol request without context switching. The server then responds to the application protocol request. Once the request has been handled, the kernel request structure can be deleted.

In one embodiment, a server system, including an operating system according to the invention, includes a user space operable to establish and maintain a user space request structure corresponding to the application protocol request. The server system also includes an operating system kernel operatively connected to the user space. The kernel is operable to maintain a kernel request structure corresponding to the application protocol request, using data received from the client in conjunction with the application protocol request. The kernel can also update the user space request structure so that the operating system can respond to the application protocol request without context switching.

In example embodiments of the invention, computer program code is used to implement many aspects of the invention. The computer program can be stored on a medium. The medium can be magnetic, such as a diskette, tape, or fixed disk, or optical, such as a CD-ROM or DVD-ROM. The computer program code can also be stored in a semiconductor device. Additionally, the computer program can be supplied via the Internet or some other type of network. A workstation or computer system that is connected to a network typically runs the computer program code supplied as part of a computer program product. This computer system can also be called a "program execution system" or "instruction execution system." The computer program code in combination with the computer system forms the means to execute the method of the invention.

DETAILED DESCRIPTION OF ONE OR MORE EMBODIMENTS

The present invention is typically embodied in computer software or a computer program product. It should be understood that not every feature of the software described is necessary to implement the invention as claimed in any particular one of the appended claims. The complete software product is described rather to fully enable the invention. It should also be understood that throughout this disclosure, where a software process or method is shown or described, the steps of the method may be performed in any order or simultaneously, unless it is clear from the context that one step depends on another being performed first.

The embodiments of the present invention described are implemented in a computing platform based on the computer operating system commonly known as "Linux" that is available as open source directly over the Internet. Linux is also available through various vendors who provide service and support for the Linux operating system. Among these vendors are Red Hat, Inc., of Research Triangle Park, N.C., the assignee of the present invention. An example of computer program code in patch format that implements the invention is included in the appendix, and its use will be discussed later. Certain, more brief code samples are included in this specification to illustrate specific concepts where discussed. All of these examples will be readily understood by those of ordinary skill in the art. It will also be understood that Linux examples are shown for illustrative purposes only. The inventive concepts described herein can be adapted to any computing platform based on any operating system, including those based on Macintosh™, Unix™ and Windows™.

Finally, it should be understood the several block diagrams and flow-charts which are used to illustrate the inventive concepts are not mutually exclusive. Rather, each one has been tailored to illustrate a specific concept discussed. In many cases, the elements or steps shown in a particular drawing co-exist with others shown in a different drawing, but only certain elements or steps are shown for clarity. For example, the block diagrams of FIGS. 1 and 4 both show elements within an operating system kernel and user space. In actual software, all of the elements in both the drawings might be present. However, only the ones relevant to a particular feature are shown in each drawing for clarity.

Figure 1:
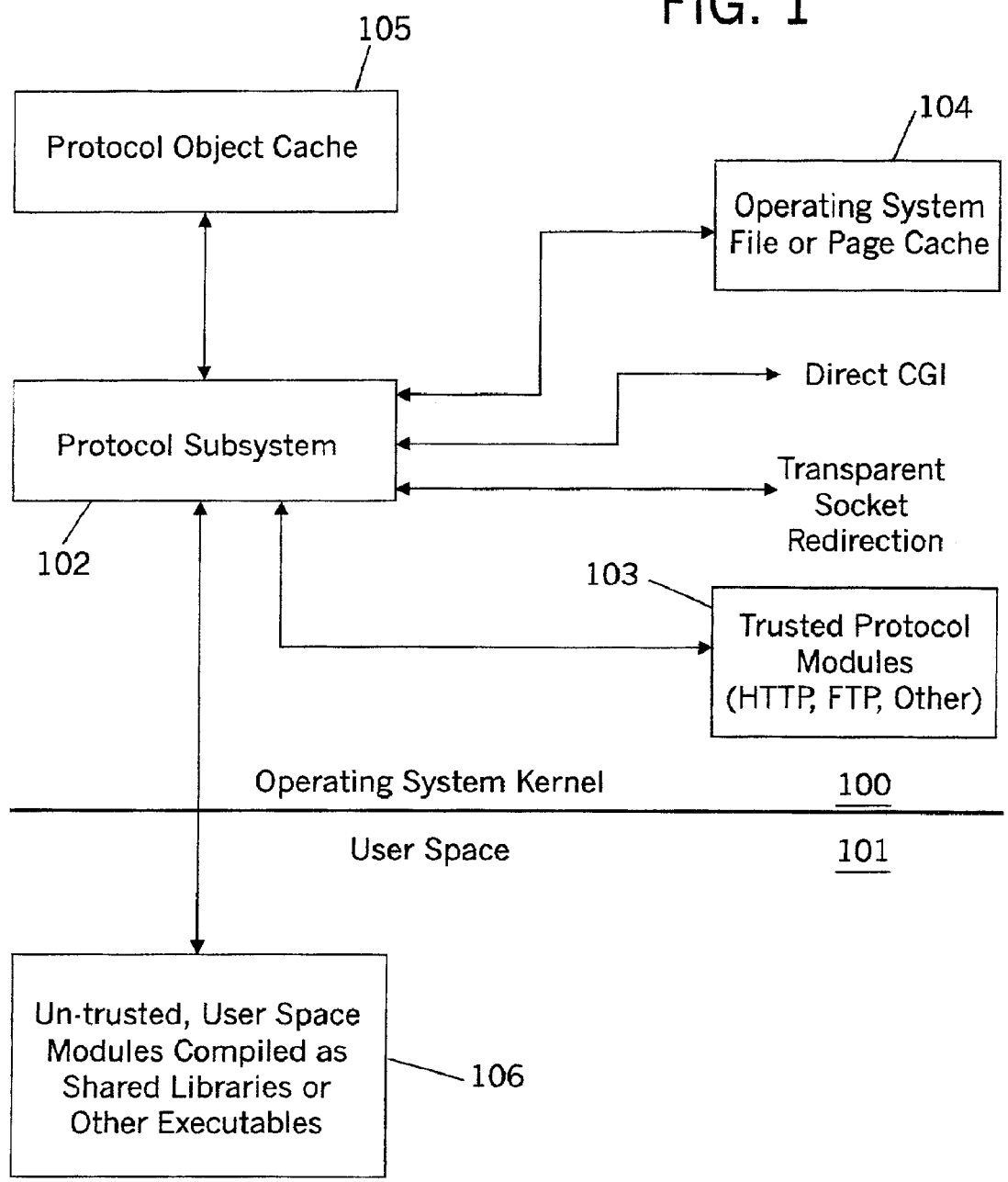
FIG. 1 is a block diagram that illustrates some features of software that implements an embodiment of the invention.

Turning to FIG. 1, a block diagram is presented that illustrates various elements of a software system having an operating system kernel, 100, and a user space, 101. The features that are illustrated by FIG. 1 are important to a computer platform or instruction execution system to be used as a server, and so the software system of FIG. 1 can be referred to as a "server system." The operating system kernel, or simply, "the kernel" is the part of the operating system software that handles hardware resources, provides fundamental functionality, and provides fundamental programming interfaces to applications. Such a programming interface is often referred to as an "application programming interface" or "API." In the present embodiment of the invention, the operating system kernel, 100, includes the capability to maintain a communication protocol stack through the use of an in-kernel, application protocol subsystem, 102. It is important to distinguish an application protocol such as HTTP or FTP from lower level protocols such as TCP/IP. Trusted protocol modules 103 are also included in the kernel and provide application protocol information and functionality to the protocol subsystem, 102. The protocols involved can be HTTP, FTP, or any other application protocol used for network communications, including so-called "meta application protocols" such as extended markup language (XML) and hypertext markup language (HTML), which use HTTP. It is to be understood that references to HTTP included herein are meant to include HTML and XML. A generic operating system cache, 104, also resides in the kernel and can be used to cache files or pages of information. Finally, a protocol object cache, 105, is also in the kernel and is operatively connected to protocol subsystem 102. The protocol object cache can be important to certain features of the software system to be discussed later. Note that, as shown in FIG. 1, the protocol subsystem in this example embodiment provides a direct common gateway interface (CGI) and transparent socket redirection.

It cannot be overemphasized that the operating system architecture discussed with FIG. 1 (and that discussed later with reference to FIG. 4) are representative examples. Some operating systems allow certain applications to be run in kernel space, but others to be run in user space. It is also possible in some circumstances for an application to run in both places, with some code running in kernel space, and other code running in user space.

User space 101 of FIG. 1 contains untrusted modules or other executables, 106. It is beneficial at this point to explain what is meant by "trusted" vs. "un-trusted" software modules. As is known by those skilled in the art, most modern operating systems are designed so that applications or the software modules residing in user space are in a "sandbox" of sorts. This sandbox guarantees that modules in the operating system cannot be corrupted or adversely affected by what goes on in user space. This concept is implemented by the designing the operating system so that modules in user space are considered "untrusted" such that their access to operating system functions is limited. Modules inside the operating system kernel, by contrast, are "trusted" and have full access to operating system functions. In this example embodiment of the invention, high-level, communication protocol applications can reside as trusted modules inside the operating system kernel. These in-kernel protocol modules and the in-kernel protocol subsystem enable a server system to respond to application protocol requests without the operating system switching contexts. It is important to note that not all operating systems have a separate user space. Some operating systems execute applications within the operating system kernel space. In these cases however, the functional relationship between the operating system and the application is the same. The operating system handles hardware and provides API's, and the application uses an API to perform application tasks.

Operations in a computer system that do not cause context switching or any other processing schedule interruptions are often referred to as "atomic" operations. With the architecture just described, communications applications can do what would normally be "non-atomic" work without context switching. When a response needs to be generated, information about the application protocol request is stored in an in-memory, in-kernel request structure which enables the kernel to resume execution once a commensurate user space request structure is updated as if the response has already taken place. An example request structure for an HTTP request is shown below. In this particular case, the user request structure is shown; however, the kernel request structure is very similar, and can be easily derived from the user space request structure.

```
typedef struct user_req_s {
    int version_major;
    int version_minor;
    int version_patch;
    int http_version;
    int http_method;
    int sock;
    int event;
    int thread_nr;
    void *id;
    void *priv;
    int http_status;
    int bytes_sent;
    char *object_addr;
    int module_index;
    char modulename[MAX_MODULENAME_LEN];
    unsigned int client_host;
    unsigned int objectlen;
    char query[MAX_URI_LEN];
    char objectname[MAX_URI_LEN];
    unsigned int cookies_len;
    char cookies[MAX_COOKIE_LEN];
    char content_type[MAX_FIELD_LEN];
    char user_agent[MAX_FIELD_LEN];
    char accept[MAX_FIELD_LEN];
    char accept_charset[MAX_FIELD_LEN];
    char accept_encoding[MAX_FIELD_LEN];
    char accept_language[MAX_FIELD_LEN];
    char cache_control[MAX_FIELD_LEN];
    char if_modified_since[MAX_FIELD_LEN];
    char negotiate[MAX_FIELD_LEN];
    char pragma[MAX_FIELD_LEN];
    char referer[MAX_FIELD_LEN];
    char *post_data;
    char new_date[DATE_LEN];
} user_req_t;
```

Figure 2:
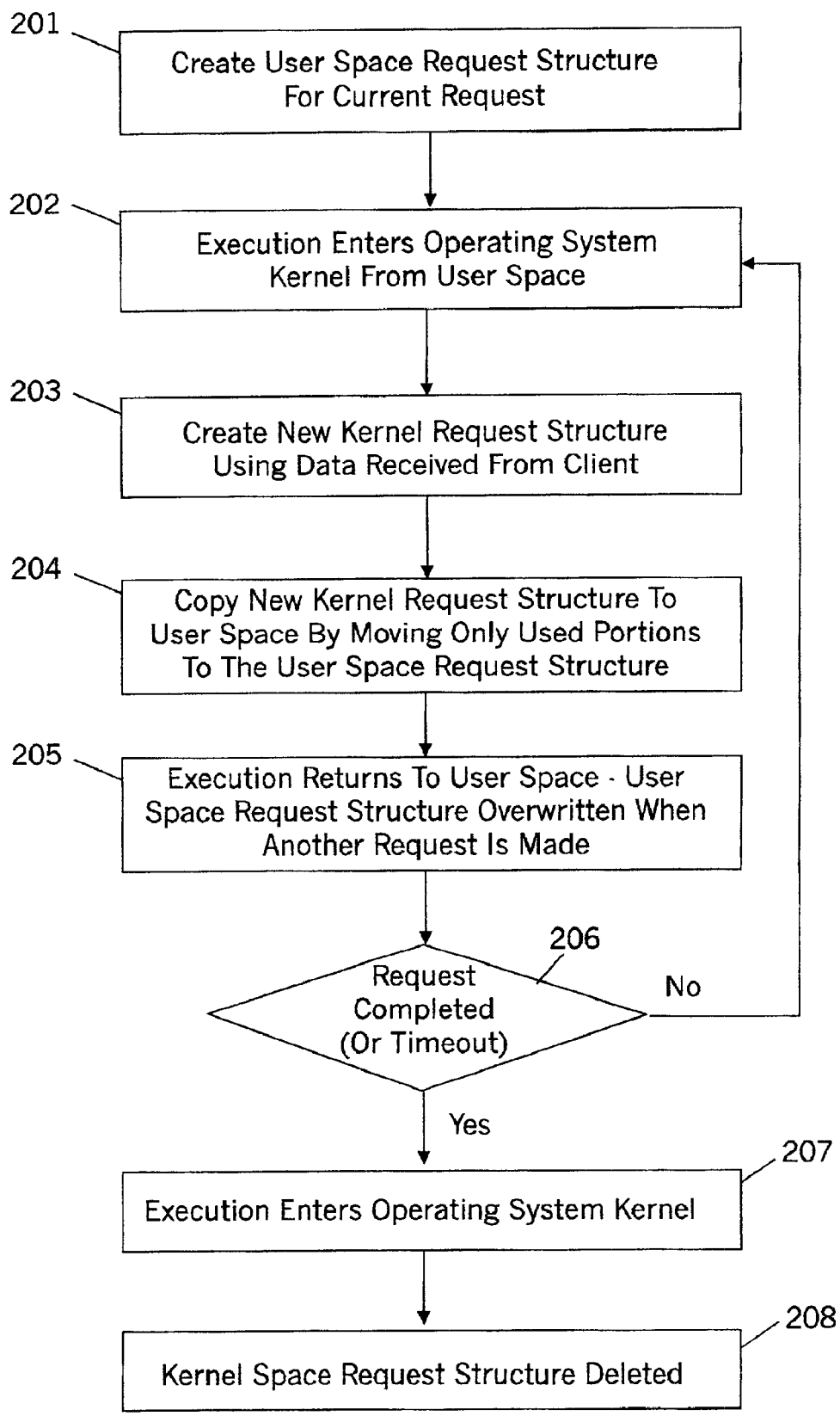
FIG. 2 is a flowchart illustrating a method performed by software that implements one embodiment of the invention.

FIG. 2 is a flowchart illustrating the method of responding to a request without context switching. At step 201 the user space request structure is created. At step 202, execution by the instruction execution system operating as a server system enters the operating system kernel. At step 203, a new kernel request structure is created to handle the request. The kernel request structure is populated with data received in conjunction with the request, usually from a client system making the request over the network. At step 204, the kernel request structure is copied to the user space by populating the user space request structure. This "copy" is most efficiently done by moving data related only to used portions of the request structures. In this case, a so-called, "private field" of the request structure would also be moved. The private field is an opaque pointer that can be used by applications for reference. At step 205, execution returns to user space, and the user space application continues operations as if the request has been handled. The user space request structure will be overwritten if another request needs to be handled. The kernel handles the request normally in due course (this step is not shown for clarity). At 206, the operating system monitors the request. If the request is completed, or a time out occurs, execution enters the operating system kernel at step 207, and the kernel request structure is deleted at 208 to save memory resources. If the request cannot be completed, but a time out has not occurred, the system will maintain the request and the request will be returned as the current request to user space after the I/O operation(s) for that request has finished. A "suspended" request will not cause execution to be suspended. It should be noted that the request is suspended—not the task, so that execution continues in user space. It is also possible for a request to be suspended on more than one I/O operation.

Figure 3:
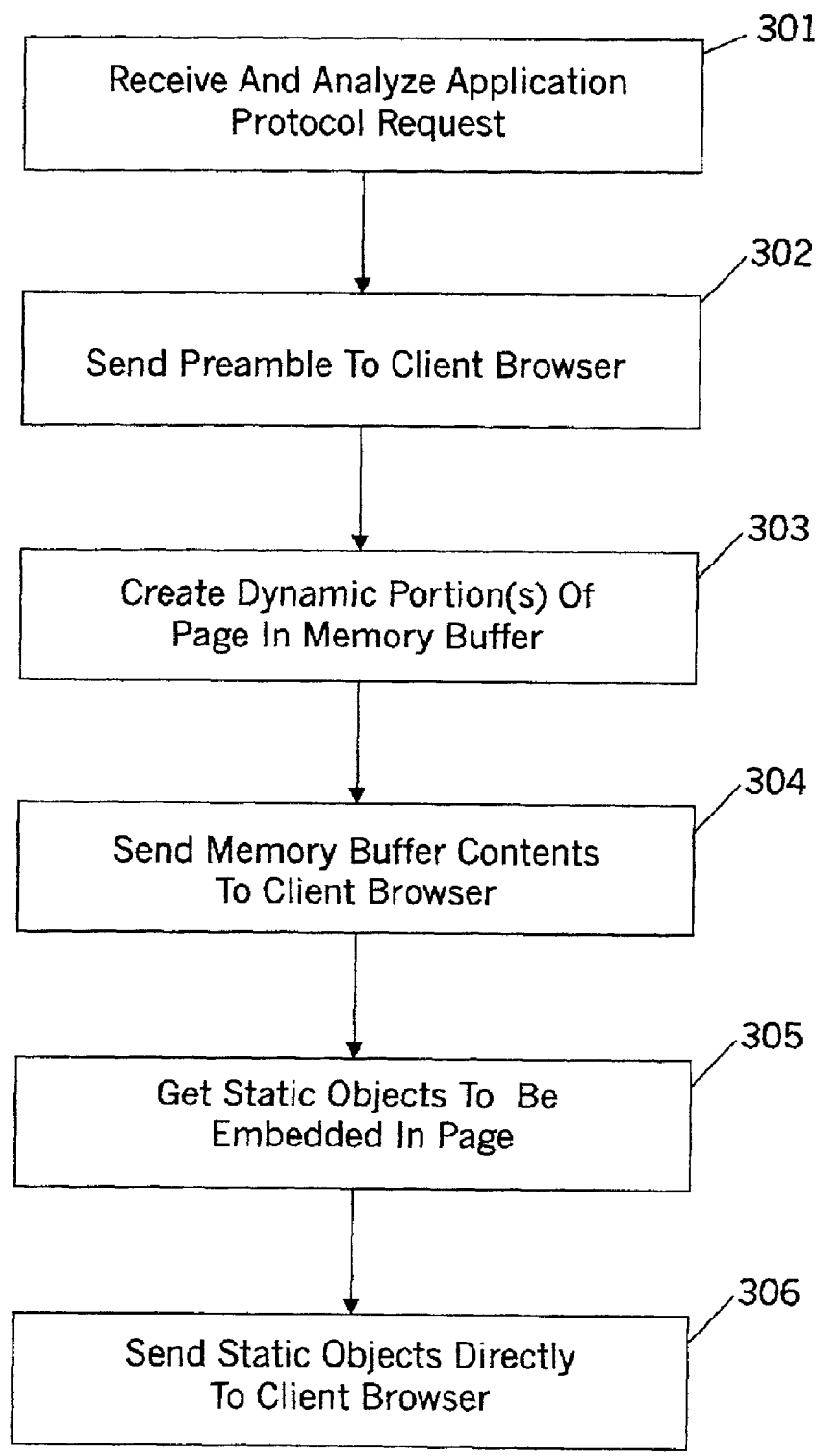
FIG. 3 is another flowchart illustrating a method performed by software that implements an embodiment of the invention.

FIG. 3 illustrates another process included in the operating system that embodies the invention; that of embedding static protocol objects in responses, such as HTTP Web pages, sent to a client application in response to an application protocol request. It should be noted that this illustrating is based on HTTP Web pages by way of example only. It may be possible to implement the invention with other application protocols, such as FTP. In this embodiment of the invention, the static protocol objects are stored in the protocol object cache, 105, of FIG. 1, but they can also reside in the generic operating system cache. At step 301 of FIG. 3 the server receives and analyses the application protocol request. A sample application protocol request in the form of an HTTP request is shown below. Such a request is normally terminated by two newline characters.

```
GET / HTTP/1.0
    User-Agent: Wget/1.6
    Host: www.redhat.com
    Accept:  */*
```

At step 302 a preamble is sent back to the client. The preamble is the header portion of an HTTP response or reply. An example header portion is shown below.

```
HTTP/1.1 200 OK
    Date: Tue, 03 Jul 2001 10:45:31 GMT
    Server: Apache/1.3.19 (Unix)   (Red-Hat/Linux) mod_ssl/2.8.1 OpenSSL/0.9.5a
    Connection: close
    Content-Type: text/html
```

At step 303 the optional dynamic portions of the reply page are created within a memory buffer on the server. The dynamic portions are made up of dynamic protocol objects, which form part of the reply. The reply can also have static protocol objects embedded within. The dynamic protocol objects are sent to the client application at step 304. At step 305 the static parts of the reply page, or static protocol objects are retrieved from the protocol object cache or the generic operating system cache. The static objects are sent to the client application at step 306, where they are embedded in the reply so that a complete reply can be displayed at the client system.

Figure 4:
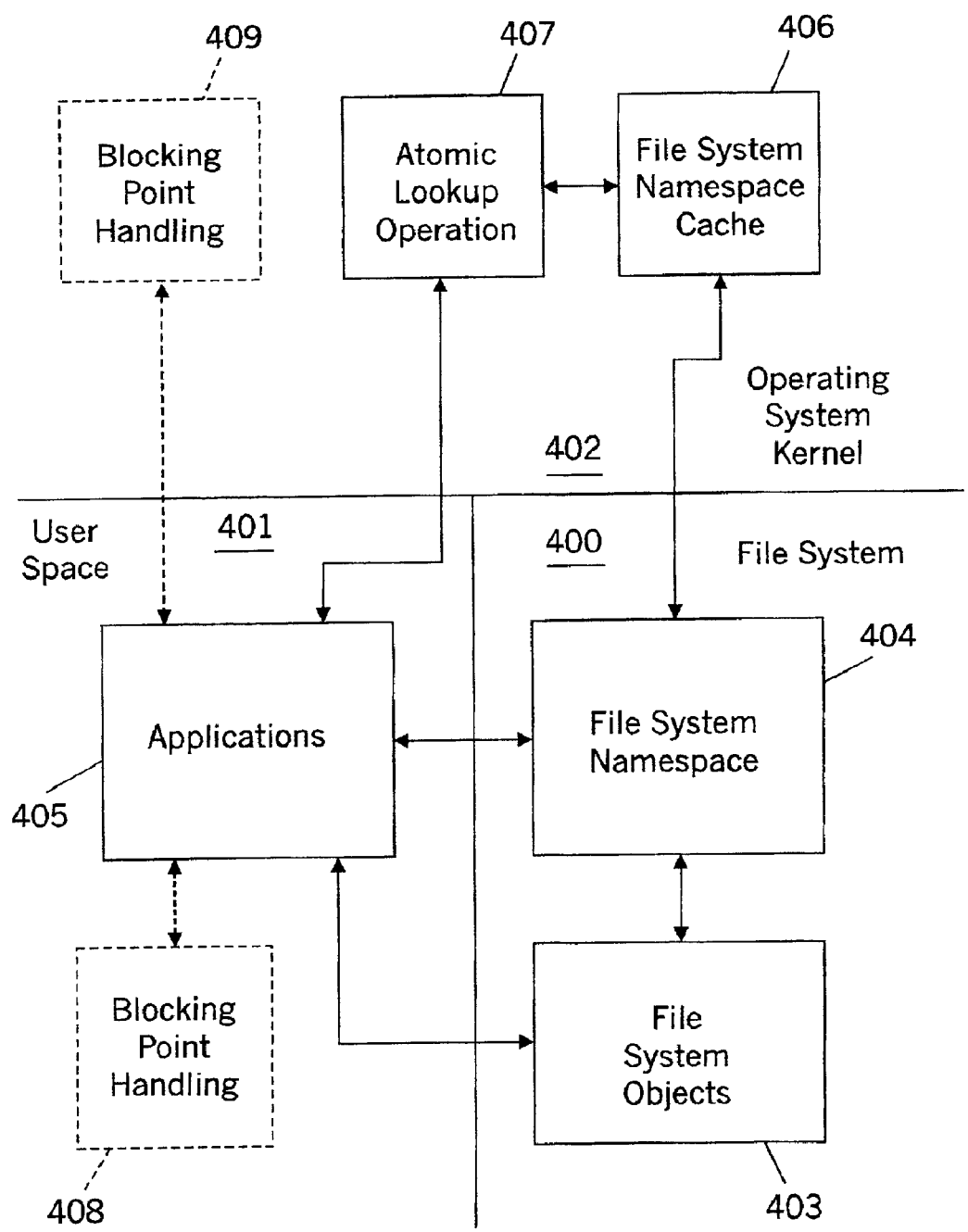
FIG. 4 is a block diagram that illustrates some features of software that implements an embodiment of the invention.

FIG. 4 is another block diagram of an embodiment of the operating system of the present invention. In this case, the block diagram is constructed to illustrate the operation of the atomic file look-up feature. FIG. 4 includes three main segments of an operating system environment: file system 400, user space 401, and operating system kernel 402. File system 400 includes file system objects 403 in the file system space. File system objects, or simply "files" are the building blocks of the file system space. In effect, they are containers of information. There are various types of file system objects, including regular files, directories, and symbolic links. A symbolic link provides a way to create a new file that in fact just points to an existing file. A symbolic link is also referred to as a soft link. The linking is done via a string including separator characters. The separator is the "/" (slash) character on Linux and Unix systems and for Internet URL's, and it is the "\" (backslash) character on Windows systems.

Note that the file system object name or file name is a string of characters which do not include the separator character, for example, "homework.doc". Every file system object has a file system object name. A file system object path or "file path" however is a string of characters which usually start with the separator character, and specify various parts of a path which will locate the file. In some systems this file path can also be called a directory path or folder path, for example, "/home/joe/docs/homework.doc".

The file system of FIG. 4 also includes the file system namespace, 404. The file system namespace refers to all file paths within the system. The paths for all the files are typically stored on the file system device in the form of directories. The user space, 401, shown in FIG. 4 is where applications 405 typically reside. These applications make use of the file system objects, 403, that are kept within file system 400. In order to make use of a not-yet-used file, the application and operating system perform a file system namespace operation. Such an operation is performed, for example, to open, read or write to a file, rename a file, or move it between directories. There are other, well-known file system namespace operations as well. For purposes of this disclosure, any of these file system namespace operations are generically referred to as "opening a file", processing a "file open request", performing a file operation, or the like. In the prior art, if an application wanted to read the first 1000 bytes of the "/home/joe/docs/homework.doc" file, it would contain computer program code similar to what is shown in the following C example.

```
fd = open("/home/joe/docs/homework.doc", O_RDONLY);
read(fd, buf, 1000);
close(fd);
```

After executing these three system-calls, the operating system kernel will have put the first 1000 bytes of the file into the memory buffer, "buf".

The operating system kernel includes a file system namespace cache, 406. The "open" system-call, as shown above, will access the file system name-space cache internally, to speed up access to files, once their path is stored in the file system namespace cache. The file system name space cache is also sometimes called a "dentry cache". Note that the namespace cache does not cache file contents. It might cache file attributes. File contents are cached in a separate data structure, such as the generic cache shown in FIG. 1, often called the "page cache", as is well-known and has been omitted from FIG. 4 for clarity.

In the prior art as illustrated above, the kernel will get to the file whatever it takes in terms of time and resources, and it is transparent to the application whether the file path with the file name was already present in the namespace cache or not. If not, the kernel would read file path details from disk, and the processing associated with the application will be suspended and context switches occur until that I/O has finished, creating a serious performance impact.

In contrast to the prior art just described, the system of FIG. 4 includes an atomic lookup operation, 407, which implements the atomic file look-up according to this embodiment of the invention. The atomic file lookup empowers an application, 405, to detect whether a file is already cached within the namespace cache, or not. The following code shows how the feature is used in practice.

```
fd = open("/home/joe/docs/homework.doc", O_RDONLY | O_ATOMICLOOKUP);
if (fd == -EWOULDBLOCKIO) {
    /*
     * The file name was not yet cached, bounce this open () to another
     * process:
     */
    return -1;
}
read(fd, buf, 1000);
close(fd);
```

Note the "O_ATOMICLOOKUP" flag and the new "-EWOULDBLOCKIO" return code for the open system-call. Upon learning that the file path is not yet cached, the application can bounce or redirect the file open to another process, as determined appropriate by the application developer. In some cases this process may be a process that performs blocking point handling.

The blocking point handling process can reside in the user space at 408 of FIG. 4, or in the kernel at 409 of FIG. 4. A "blocking point" is a point where a lookup would cause a possible context switch. "Handling the blocking point" might involve bouncing this lookup to another process/thread, which can manage the file open in a way that improves performance.

Figure 5:
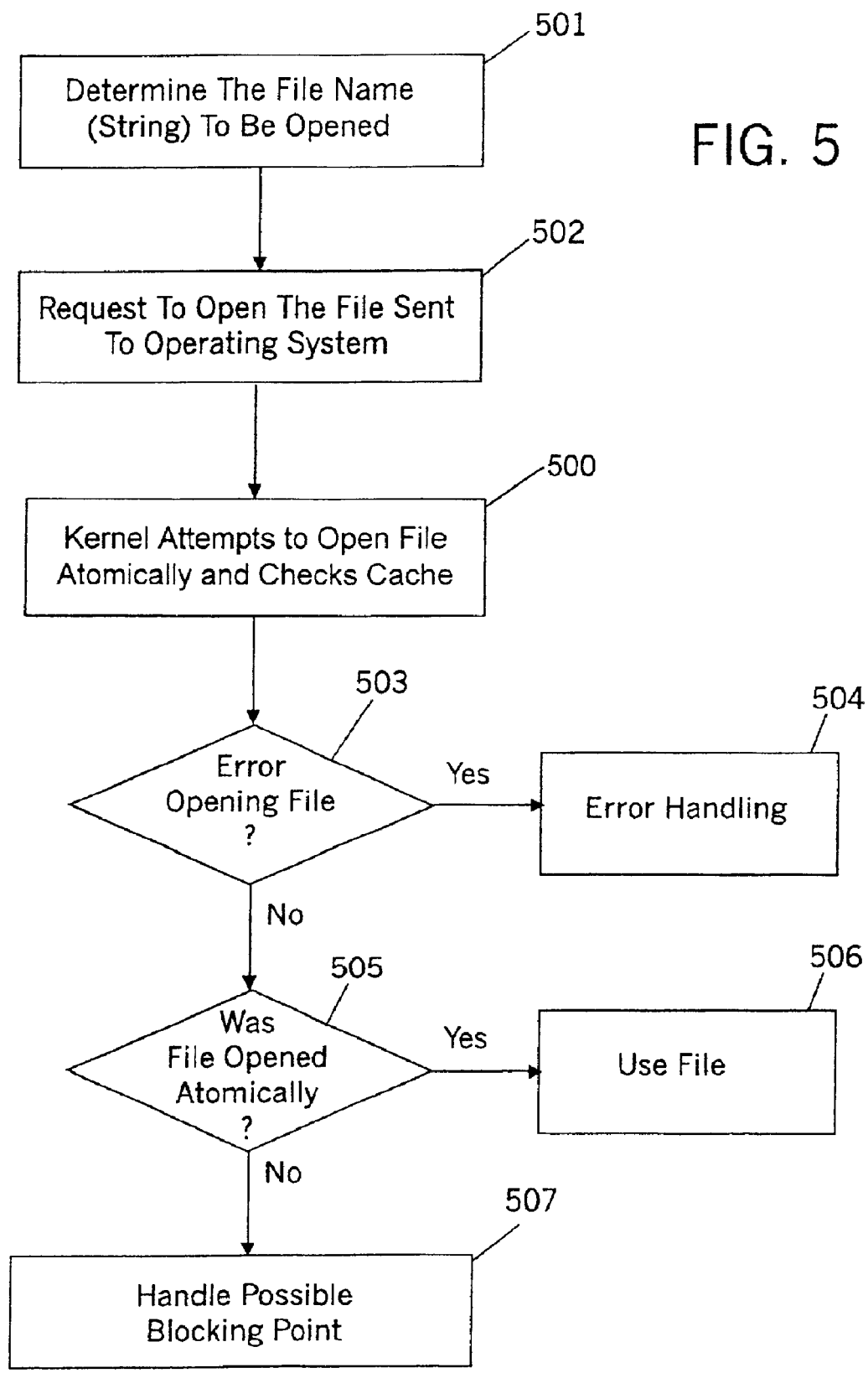
FIG. 5 is a flowchart illustrating a method performed by software that implements one embodiment of the invention.

FIG. 5 illustrates one example of the atomic look-up operation in flow-chart form. At step 501 an application determines what file name, as designated by a character string, is to be opened. At 502 the file open request is made to the operating system. At step 500 the operating system kernel receives the request and attempts to open the file atomically. In order to attempt the atomic open, the kernel checks the file system namespace cache for the appropriate file path. Step 503 is a decision point that checks for errors such as the lack of existence of such a file. This process is handled in the same way as in the prior art. If there is an error, it is handled by an error handling routine at 504. If there is no error, processing continues. The operating system kernel notifies the application at step 505 as to whether the file was or is being opened atomically because its path was stored in the file system namespace cache. If the file was opened atomically, the file is used at step 506. If not, since the application has been notified of the fact that an atomic open was not possible at step 505, a possible blocking point is handled at step 507.

Note that in this embodiment, the application does not send an inquiry as to whether the file path is cached. It simply notifies the operating system kernel that it wants to open a file atomically. If the kernel can comply because the file path is cached, the file is opened and a handle is returned to the application. If the file path is not cached, then the file is not opened, and —EWOULDBLOCKIO is returned to the application. With respect to the discussion herein of this feature, the terminology "was opened", "could be opened", "is being opened", and the like is used inter-changeably. Likewise, the terminology regarding a file operation such as "was performed", "is being performed", "could be performed", and the like are used inter-changeably. The operation of the invention is the same regardless of the exact timing of the checking of the cache, the file opening, and the notification from the operating system kernel to an application.

There are many variations of the operating system architecture described above, any of which, can also include the atomic look-up operation. For example, the file system device does not have to reside on the computer system that is maintaining the operating system kernel, but can instead be accessed over a network. In this case, the file system namespace and be located with the networked file system device, located on the system that is maintaining the operating system kernel, or distributed in both places. It is also important to note that not all operating system environments have a user space as a separate protection domain. In some operating systems, for example, those commonly used with embedded processors, applications are maintained and executed within the operating system kernel. In this case, the operating system still provides API's for applications, and the operating system still communicates with an application through its API, just the same as if the application were running in a user space.

Included at the end of this specification before the claims is one example of a source code listing showing code that implements the atomic look-up feature. This source code listing is entitled, "Source Code Listing Submitted as Part of the Specification." The source code is in the well-known differential patch format. It patches the publicly available version 2.4.2 of the Linux operating system, an open source operating system that can be acquired over the Internet, and from companies that provide support for it, such as Red Hat, Inc., the assignee of the present application. The code contained in the source code appendix for the present application, discussed below, also implements the atomic look-up feature.

Figure 6:
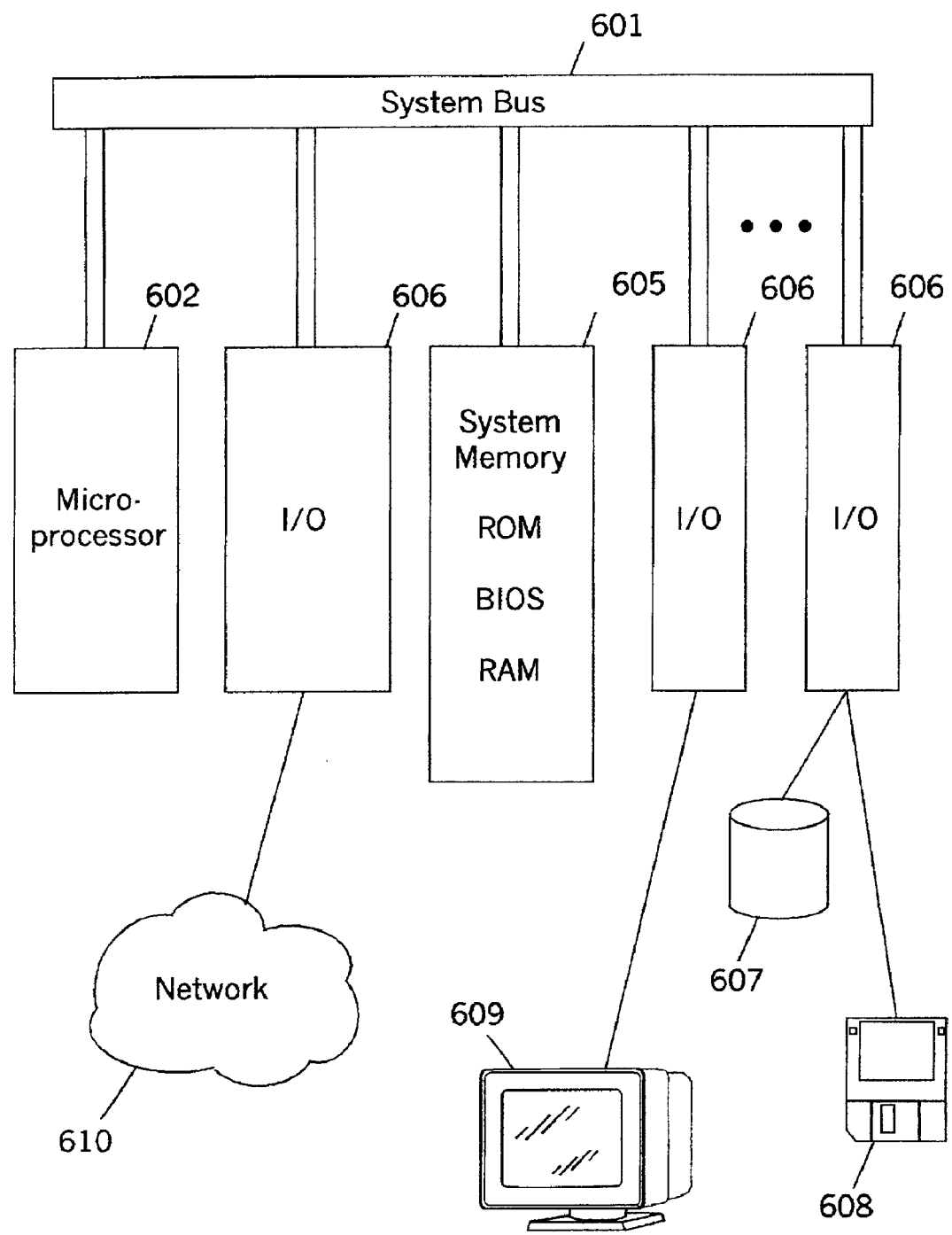
FIG. 6 is a block diagram of a computer system that is implementing an embodiment of the invention.

As previously discussed, in some embodiments, the invention is implemented through computer program code operating on a programmable computer system or instruction execution system such as a personal computer or workstation, or other microprocessor-based platform. FIG. 6 illustrates further detail of a computer system that is implementing the invention in this way. System bus 601 interconnects the major components. The system is controlled by microprocessor 602, which serves as the central processing unit (CPU) for the system. System memory 605 is typically divided into multiple types of memory or memory areas such as read-only memory (ROM), random-access memory (RAM) and others. The system memory may also contain a basic input/output system (BIOS). A plurality of general input/output (I/O) adapters or devices, 606, are present. Only three are shown for clarity. These connect to various devices including a fixed disk drive, 607, a diskette drive, 608, network, 610, and a display, 609. Computer program code instructions for implementing the functions of the invention are stored on the fixed disk, 607. When the system is operating, the instructions are partially loaded into memory, 605 and executed by microprocessor 602. Optionally, one of the I/O devices is a network adapter or modem for connection to network, 610, which may be the Internet. It should be noted that the system of FIG. 6 is meant as an illustrative example only. Numerous types of general-purpose computer systems are available and can be used.

Elements of the invention may be embodied in hardware and/or software as a computer program code (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system such as that shown in FIG. 6. Such a medium is illustrated graphically in FIG. 6 to represent the diskette drive. A computer-usable or computer-readable medium may be any medium that can contain, store, communicate, or transport the program for use by or in connection with an instruction execution system. The computer-usable or computer-readable medium, for example, an electronic, magnetic, optical, electromagnetic, infrared, or semiconductor system. The medium may also be simply a stream of information being retrieved when the computer program product is "downloaded" through a network such as the Internet. Note that the computer-usable or computer-readable medium could even be paper or another suitable medium upon which a program is printed.

The appendix to this application includes source code in differential patch format that implements the features described in this specification. The source code is intended to patch a version of the Linux operating system, an open source operating system that can be acquired over the Internet, and from companies that provide support for it, such as Red Hat, Inc., the assignee of the present application. The code is intended to patch version 2.4.5 of the Linux operating system, which has already been patched by the well-known, so-called, "ac4" patch. Version 2.4.5 of Linux is available, among other places, at: www.kernel.org/pub/linux/kernel/v2.4/linux-2.4.5.tar.gz. The above-mentioned ac4 patch is available, among other places, at: www.kernel.org/pub/linux/kernel/people/alan/2.4/patch-2.4.5-ac4.gz. A copy of a Linux operating system that includes all the features described herein can be constructed by downloading the files mentioned above, and entering, on a Linux system:

```
tar xzf linux-2.4.5.tar.gz
    gzip -d patch-2.4.5.-ac4.gz
    cd linux
    patch -p1 < ../patch-2.4.5-ac4
    cd ..
    patch -p0 < tux2-full.txt
```

Specific embodiments of an invention are described herein. One of ordinary skill in the computing arts will quickly recognize that the invention has other applications in other environments. In fact, many embodiments and implementations are possible. The following claims are in no way intended to limit the scope of the invention to the specific embodiments described above.

Source Code Listing Submitted as Part of the Specification

```
---     linux/fs/namei.c.origTue Apr 17 13:18:46 2001
+++     linux/fs/namei.c Tue Apr 17 13:18:52 2001
@@      -423,9 +423,13 @@
        {
            struct dentry *dentry;
            struct inode *inode;
-           int err;
+           int err, atomic;
            unsigned int lookup_flags = nd->flags;
+           atomic = 0;
+           if (lookup_flags & LOOKUP_ATOMIC)
+               atomic = 1;
+
            while (*name=='/')
                name++;
            if (!*name)
@@      -494,6 +498,9 @@
                /* This does the actual lookups.. */
                dentry = cached_lookup(nd->dentry, &this, LOOKUP_CONTINUE);
                if (!dentry) {
+                   err = -EWOULDBLOCKIO;
+                   if (atomic)
+                       break;
                    dentry = real_lookup(nd->dentry, &this, LOOKUP_CONTINUE);
                    err = PTR_ERR (dentry);
                    if (IS_ERR(dentry))
@@      -557,6 +564,9 @@
                }
                dentry = cached_lookup(nd->dentry, &this, 0);
                if (!dentry) {
+                   err = -EWOULDBLOCKIO;
+                   if (atomic)
+                       break;
                    dentry = real_lookup(nd->dentry, &this, 0);
                    err = PTR_ERR(dentry);
                    if (IS_ERR(dentry))
@@      -891,6 +901,8 @@
            if (f & O_DIRECTORY)
                retval |= LOOKUP_DIRECTORY;
+           if (f & O_ATOMICLOOKUP)
+               retval |= LOOKUP_ATOMIC;
            return retval;
        }
---     linux/include/linux/fs.h.origTue Apr 17 13:18:51 2001
+++     linux/include/linux/fs.h Tue Apr 17 13:18:52 2001
@@      -1203,6 +1203,7 @@
        #define LOOKUP_POSITIVE                 (8)
        #define LOOKUP_PARENT                   (16)
        #define LOOKUP_NOALT                    (32)
+       #define LOOKUP_ATOMIC                   (64)
        /*
         * Type of the last component on LOOKUP_PARENT
         */
---     linux/include/asm-i386/fcntl.h.orig    Fri Sep 22 23:21:19 2000
+++     linux/include/asm-i386/fcntl.h    Tue Apr 17 13:18:52 2001
@@      -20,6 +20,7 @@
        #define O_LARGEFILE        0100000
        #define O_DIRECTORY        0200000         /* must be a directory */
        #define O_NOFOLLOW         0400000         /* don't follow links */
```

-continued

```
+       #define O_ATOMICLOOKUP       01000000              /* do atomic file lookup */
        #define F_DUPFD              0             /* dup */
        #define F_GETFD              1             /* get close_on_exec */
---     linux/include/asm-alpha/fcntl.h.orig   Sun Oct  8 18:04:04 2000
+++     linux/include/asm-alpha/fcntl.h        Tue Apr 17 13:18:52 2001
@@ -21,6 +21,8 @@
        #define O_DIRECTORY          0100000              /* must be a directory */
        #define O_NOFOLLOW           0200000              /* don't follow links */
        #define O_LARGEFILE          0400000              /* set by the kernel on every open */
+       #define O_ATOMICLOOKUP       01000000             /* do atomic file lookup */
+
        #define F_DUPFD              0             /* dup */
        #define F_GETFD              1             /* get close_on_exec */
---     linux/include/asm-sparc/fcntl.h.orig   Tue Oct 10 19:33:52 2000
+++     linux/include/asm-sparc/fcntl.h        Tue Apr 17 13:18:52 2001
@@ -20,6 +20,7 @@
        #define O_DIRECTORY          0x10000              /* must be a directory */
        #define O_NOFOLLOW           0x20000              /* don't follow links */
        #define O_LARGEFILE          0x40000
+       #define O_ATOMICLOOKUP       0x80000              /* do atomic file lookup */
        #define F_DUPFD              0             /* dup */
        #define F_GETFD              1             /* get close_on_exec */
---     linux/include/asm-sparc64/fcntl.h.orig   Tue Oct 10 19:33:52 2000
+++     linux/include/asm-sparc64/fcntl.h        Tue Apr 17 13:18:52 2001
@@ -20,6 +20,7 @@
        #define O_DIRECTORY          0x10000              /* must be a directory */
        #define O_NOFOLLOW           0x20000              /* don't follow links */
        #define O_LARGEFILE          0x40000
+       #define O_ATOMICLOOKUP       0x80000              /* do atomic file lookup */
        #define F_DUPFD              0             /* dup */
        #define F_GETFD              1             /* get close_on_exec */
---     linux/include/asm-ia64/fcntl.h.orig    Tue Oct 10 02:54:58 2000
+++     linux/include/asm-ia64/fcntl.h         Tue Apr 17 13:18:52 2001
@@ -28,6 +28,7 @@
        #define O_LARGEFILE          0100000
        #define O_DIRECTORY          0200000              /* must be a directory */
        #define O_NOFOLLOW           0400000              /* don't follow links */
+       #define O_ATOMICLOOKUP       01000000             /* do atomic file lookup */
        #define F_DUPFD              0             /* dup */
        #define F_GETFD              1             /* get close_on_exec */
```

I claim:

1. A method of responding to an application protocol request, the method comprising the steps of:
   receiving the application protocol request;
   establishing a user space request structure corresponding to the application protocol request;
   creating a kernel request structure corresponding to the application protocol request, using data received from a client system in conjunction with the application protocol request;
   updating the user space request structure in accordance with the kernel request structure so that an application in the user space can continue execution and an operating system at a server can respond to the application protocol request without context switching; and
   responding to the application protocol request.

2. The method of claim 1 further comprising the step of deleting the kernel request structure after responding to the application protocol request.

3. The method of claim 1 wherein the application protocol request and any response to the application protocol request are formatted according to a hypertext transmission protocol (HTTP).

4. The method of claim 2 wherein the application protocol request and any response to the application protocol request are formatted according to a hypertext transmission protocol (HTTP).

5. The method of claim 1 wherein the application protocol request and any response to the application protocol request are formatted according to a file transfer protocol (FTP).

6. The method of claim 2 wherein the application protocol request and any response to the application protocol request are formatted according to a file transfer protocol (FTP).

7. A computer program product having computer program code embodied therein, the computer program code for enabling a server comprising an operating system having a kernel and a user space to respond to an application protocol request, the computer program code comprising:
   instructions for receiving the application protocol request;
   instructions for establishing a user space request structure corresponding to the application protocol request;
   instructions for creating a kernel request structure corresponding to the application protocol request, using data received from a client system in conjunction with the application protocol request;
   instructions for updating the user space request structure in accordance with the kernel request structure so that an application in the user space can continue execution and the operating system can respond to the application protocol request without context switching;
   instructions for responding to the application protocol request; and
   instructions for deleting the kernel request structure.

8. The computer program product of claim 7 wherein the computer program code further comprises instructions for implementing a hypertext transmission protocol (HTTP).

9. The computer program product of claim 7 wherein the computer program code further comprises instructions for implementing a file transfer protocol (FTP).

10. The computer program product of claim 8 wherein the computer program code further comprises instructions for implementing a file transfer protocol (FTP).

11. Apparatus comprising an operating system having a kernel and a user space, the apparatus operable to respond to an application protocol request, the apparatus comprising:

means for receiving the application protocol request;

means for establishing a user space request structure corresponding to the application protocol request;

means for creating a kernel request structure corresponding to the application protocol request, using data received from a client system in conjunction with the application protocol request;

means for updating the user space request structure in accordance with the kernel request structure so that an application in the user space can continue execution and an operating system at a server can respond to the application protocol request without context switching;

means for responding to the application protocol request; and means for deleting the kernel request structure.

12. A server system including an operating system, the server system operable to respond to an application protocol request, the server system comprising:

a user space operable to establish and maintain a user space request structure corresponding to the application protocol request; and an operating system kernel connected to the user space operable to maintain a kernel request structure corresponding to the application protocol request, using data received from a client system in conjunction with the application protocol request and to update the user space request structure so that the operating system can respond to the application protocol request without context switching.

13. The server system of claim 12 wherein the operating system kernel further comprises:

at least one protocol module; and a protocol subsystem operably connected to the user space and the at least one protocol module, the protocol subsystem at least in part enabling the operating system kernel to maintain the kernel request structure.

14. The server system of claim 13 wherein the at least one protocol module further comprises a hypertext transmission protocol (HTTP) module.

15. The server system of claim 13 wherein the at least one protocol module further comprises a file transfer protocol (FTP) module.

16. The server system of claim 14 wherein the at least one protocol module further comprises a file transfer protocol (FTP) module.

17. An instruction execution system operable as a communication protocol server comprising an operating system having a kernel and a user space, the instruction execution system operable to respond an application protocol request by performing the steps of:

receiving the application protocol request;

establishing a user space request structure corresponding to the application protocol request;

creating a kernel request structure corresponding to the application protocol request, using data received from a client system in conjunction with the application protocol request;

updating the user space request structure in accordance with the kernel request structure so that an application in the user space can continue execution and the operating system can respond to the application protocol request without context switching; and responding to the application protocol request.

18. The instruction execution system of claim 17 further operable as a hypertext transmission protocol (HTTP) server.

19. The instruction execution system of claim 17 further operable as a file transmission protocol (FTP) server.

20. The instruction execution system of claim 17 further operable as both a hypertext transmission protocol (HTTP) server and a file transmission protocol (FTP) server.

* * * * *